Jan. 5, 1954 J. BALTON 2,664,834
APPARATUS FOR FORMING EDIBLE RECEPTACLES
Filed Aug. 6, 1951 7 Sheets-Sheet 1

INVENTOR.
JAMES BALTON
BY
Estabrook & Estabrook
ATTORNEYS

Jan. 5, 1954

J. BALTON 2,664,834

APPARATUS FOR FORMING EDIBLE RECEPTACLES

Filed Aug. 6, 1951

INVENTOR.
JAMES BALTON
BY
Estabrook & Estabrook
ATTORNEYS

Jan. 5, 1954
J. BALTON
2,664,834
APPARATUS FOR FORMING EDIBLE RECEPTACLES
Filed Aug. 6, 1951
7 Sheets-Sheet 6
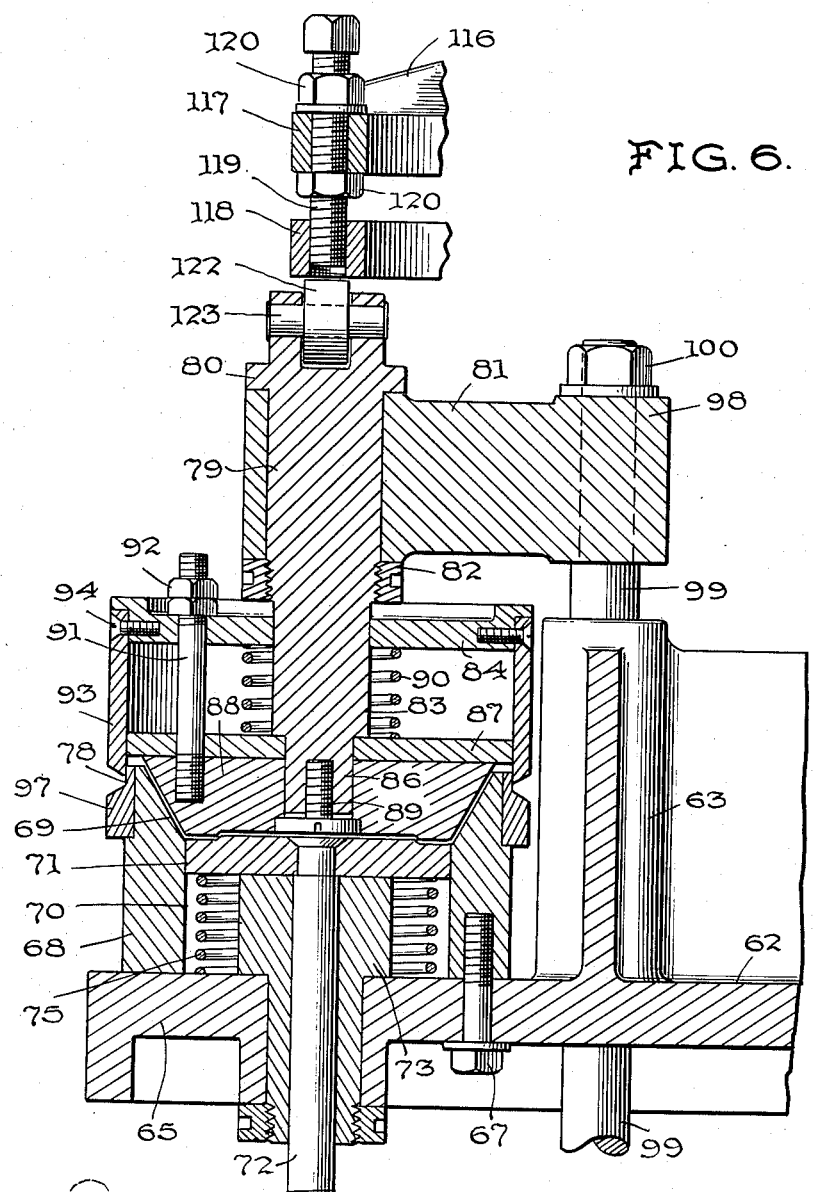
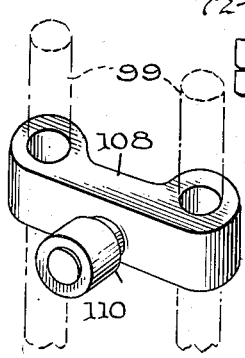
INVENTOR.
JAMES BALTON
BY
Estabrook & Estabrook
ATTORNEYS Jan. 5, 1954 J. BALTON 2,664,834
APPARATUS FOR FORMING EDIBLE RECEPTACLES
Filed Aug. 6, 1951 7 Sheets-Sheet 7

INVENTOR.
JAMES BALTON
BY Estabrook & Estabrook
ATTORNEYS

Patented Jan. 5, 1954

2,664,834

UNITED STATES PATENT OFFICE 2,664,834

APPARATUS FOR FORMING EDIBLE RECEPTACLES

James Balton, Baltimore, Md., assignor to Maryland Baking Company, Inc., Baltimore, Md., a corporation of Maryland Application August 6, 1951, Serial No. 240,558

12 Claims. (Cl. 107—15)

This invention relates broadly to pastry making and more specifically to an apparatus for forming or shaping edible pastry receptacles or shells for various food products, such as, ice cream, salads, confections and the like.

Heretofore edible receptacles made from baked sugar cakes for the reception and retention of ice cream or other frozen confectionary have generally been in the form of cones which have to be held while the contents are being eaten. In many instances it is highly desirable that such receptacles be formed with a flat bottom. By having such a configuration the receptacle may be readily placed upon a suitable support, such as a plate, and thus serve as a small dish which may be eaten in conjunction with the contents contained therein.

In the forming or shaping of edible receptacles or shells from baked sugar cakes one of the greatest difficulties has been to form the shells while still in a warm and pliable condition so that they will not crack or break. This is particularly true when the shell is formed with a relatively large circular flat bottom which terminates in a relatively short upstanding circular flange or side wall. With such a receptacle or dish a large portion of confectionary or ice cream, such as a block of ice cream, may be placed therein and said dish and contents may be consumed with relative ease and without the tendency of the contents to leak or fall out as is often the case with conventional cones.

One of the objects of the present invention is to provide an apparatus for forming an edible receptacle from baked sugar cases.

Another object is to provide an apparatus having a plurality of coacting molds for forming or shaping an edible shell having a flat bottom capable of being placed upon a suitable support.

Another object is to provide an apparatus having a plurality of coacting dies with trimming means for removing excess material during the forming of edible shells from baked sugar cakes.

Another object is to provide an apparatus having a plurality of coacting travelling molds with means for ejecting and removing from said molds edible shells formed from baked sugar cakes.

A further object is to provide an edible receptacle forming apparatus having a plurality of cam tracks for actuating a plurality of rotating coacting dies.

A still further object is to provide an edible receptacle forming apparatus having a plurality of rotating coacting dies with guide members associated therewith to facilitate the positioning and retention of baked sugar cakes upon one of the die members.

Other objects and advantages more or less ancillary to the foregoing and the manner in which all of the various objects are realized will appear in the following description, which considered in connection with the accompanying drawings, sets forth the preferred embodiment of the invention.

Referring to the drawings wherein the preferred embodiment of the invention is illustrated:

Figure 6 is a vertical sectional view showing in detail one of the coacting dies in a closed position, the section being taken on a plane indicated by the line 6—6 of Figure 1;

Figure 7 is a perspective view of a yoke member showing the roller thereon for engaging the cam actuating tracks;

Figure 2:
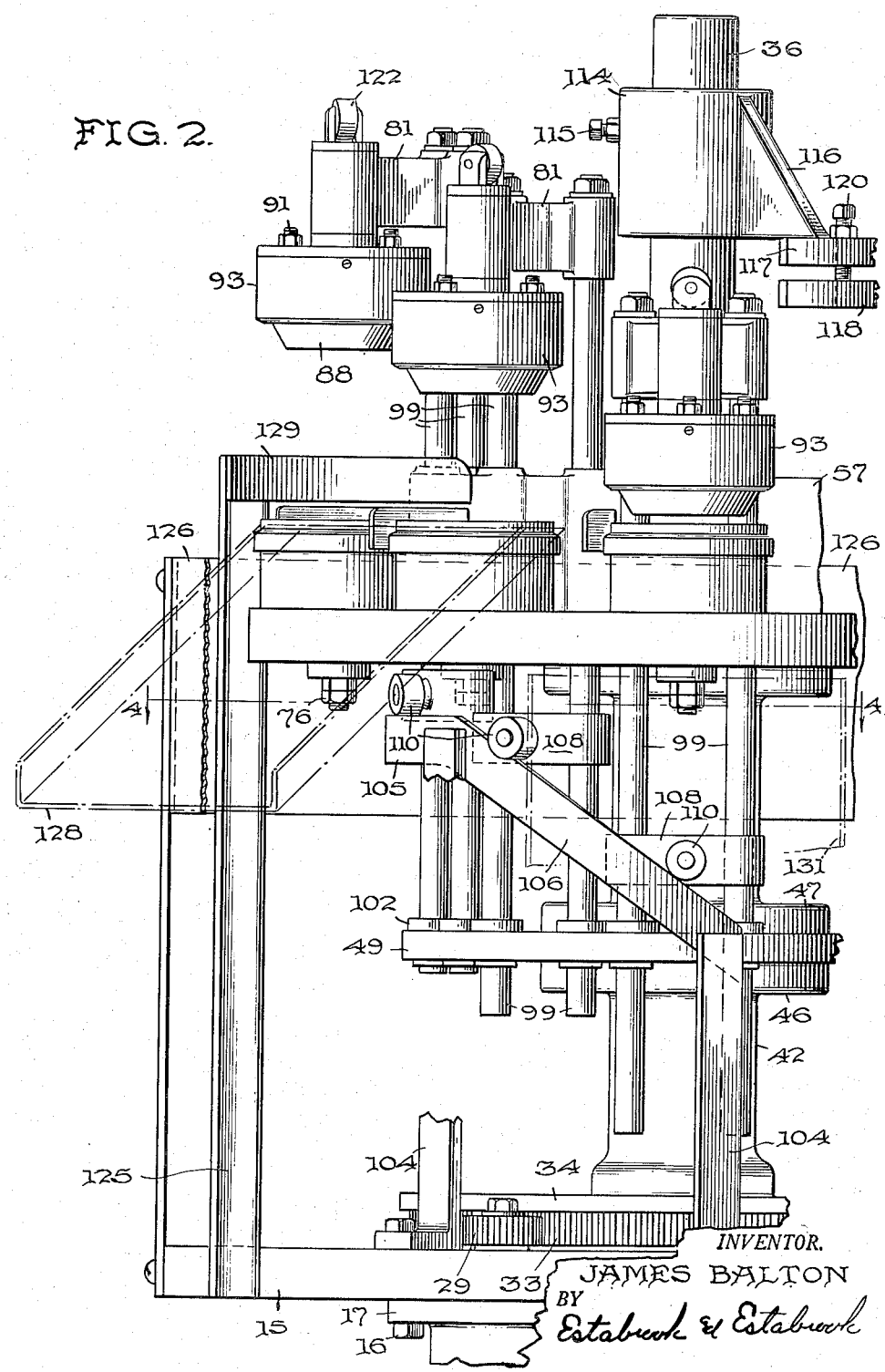
Figure 2 is a side elevational view of a portion of the present apparatus, the view being taken on a plane indicated by the lines 2—2 of Figures 1 and 4.
Figure 5:
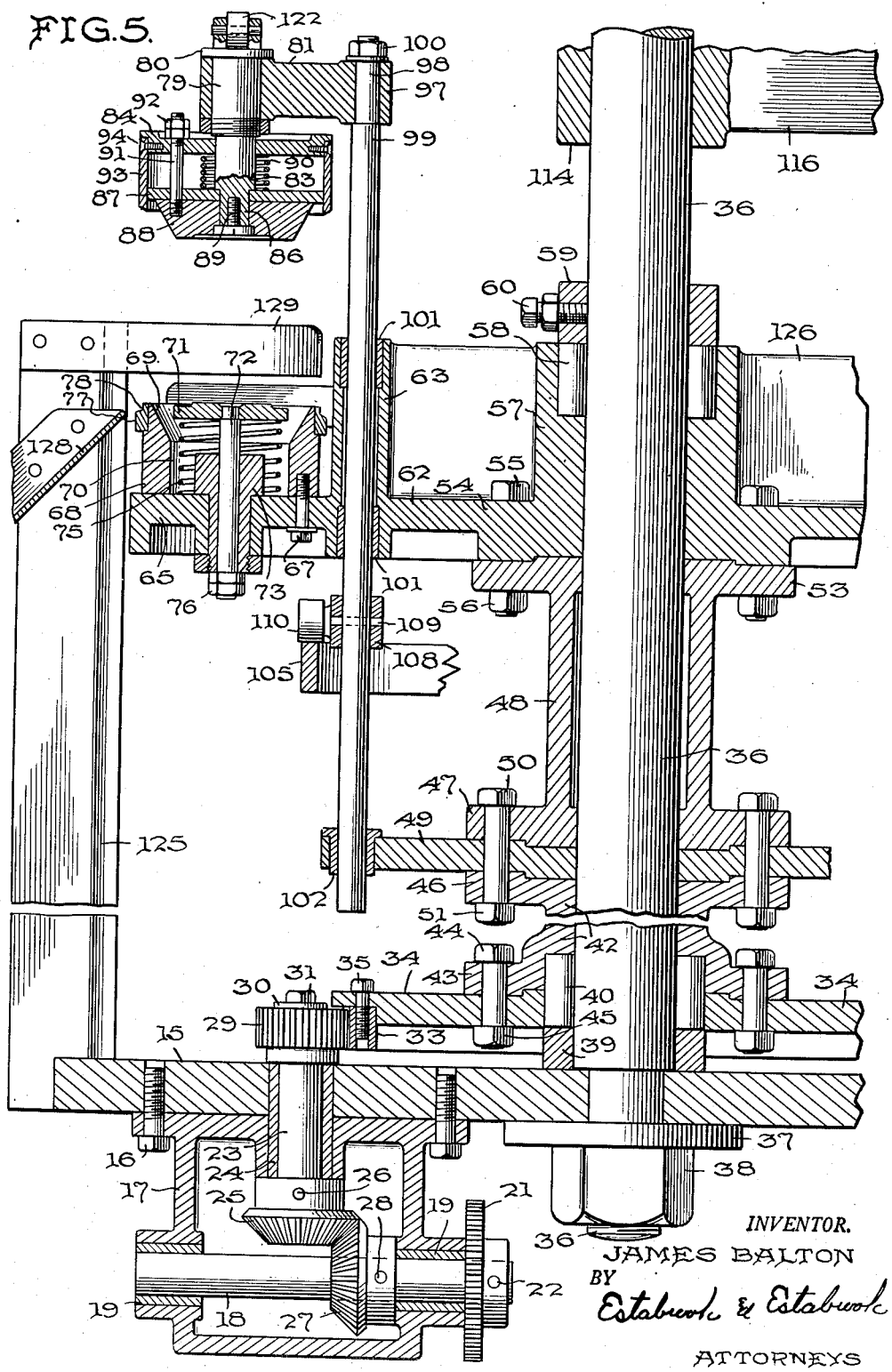
Figure 5 is a vertical sectional view of the apparatus showing one of the coacting dies in an open position and a portion of the actuating mechanism therefor, the section being taken on a plane indicated by the line 5—5 of Figure 1.

Referring to the drawings there is shown in Figures 2 and 5 a base member 15, preferably of circular configuration, which is mounted in any suitable manner upon a plurality of spaced supports or legs, not shown. The base member 15 has affixed to the lower face thereof, by bolts 16, a gear housing 17 which has a transversely extending drive shaft 18 mounted in suitable bearing supports 19. One end of the drive shaft 18 projects outwardly from the gear housing 17 and has a gear 21 secured thereto by a pin 22 that extends through the hub of gear 21 and shaft 18. A suitable sprocket chain and motor of a conventional design, not shown, are adapted to be connected to the gear 21 for rotating shaft 18.

The gear housing 17 has a driven shaft 23 mounted therein in a plane at right angles to the drive shaft 18. The shaft 23 projects out of the gear housing 17 and through the base member 15 and is rotatably mounted in suitable bearing supports 24. The portion of the driven shaft 23 within the gear housing 17 has a pinion gear 25 secured thereto by a pin 26 which gear meshes with a pinion gear 27 that is secured to the drive shaft 18 by a pin 28. The end portion of the driven shaft 23 that extends through and above the base member 15 has a gear 29 keyed thereto while a retaining plate or washer 30 is affixed to the end of the shaft 23 by a bolt 31 and adapted to overlie the hub of said gear. The gear 29 meshes with a ring gear 33 that is secured to the lower face of a plate 34 by suitable bolts 35. The plate 34 rotates about a vertically extending guide or supporting post 36 that is mounted on the base member 15 by a plate 37 and nut 38. The post 36 has a collar 39 mounted thereon which rests on the base member 15 and constitutes a support for the bearing ring 40 that is interposed between the post 36 and plate 34.

A tube or sleeve 42 which encloses a portion of the post 36 is rotatably mounted on the bearing ring 40. The lower end portion of the sleeve 42 is formed with an outwardly projecting annular flange 43 which is secured to the plate 34 by bolts 44 and nuts 45. The upper end portion of the sleeve 42 is also provided with an outwardly projecting annular flange 46 that cooperates with a complementary flange 47 formed on a second tube or sleeve 48 for retaining and supporting a horizontally disposed circular guide plate or member 49. The guide plate 49 is secured between the flanges 46 and 47 of the sleeves 42 and 48 by bolts 51 and nuts 52. The upper end portion of the sleeve 48 is formed with an outwardly projecting annular flange 53 that is secured to the bottom face of a lower die or mold supporting ring member 54 by bolts 55 and nuts 56. The die supporting ring or base member 54 is formed with an enlarged hub 57 having a recessed portion for a bearing ring 58 which is retained in place by a collar 59 secured to the post 36 by a screw 60. Thus upon the rotation of driven shaft 23 the ring gear 33 and plate 34 are rotated which in turn drive the sleeves 42 and 48 about post 36 so as to rotate the guide member 49 and the die supporting base member 54.

Figure 8:
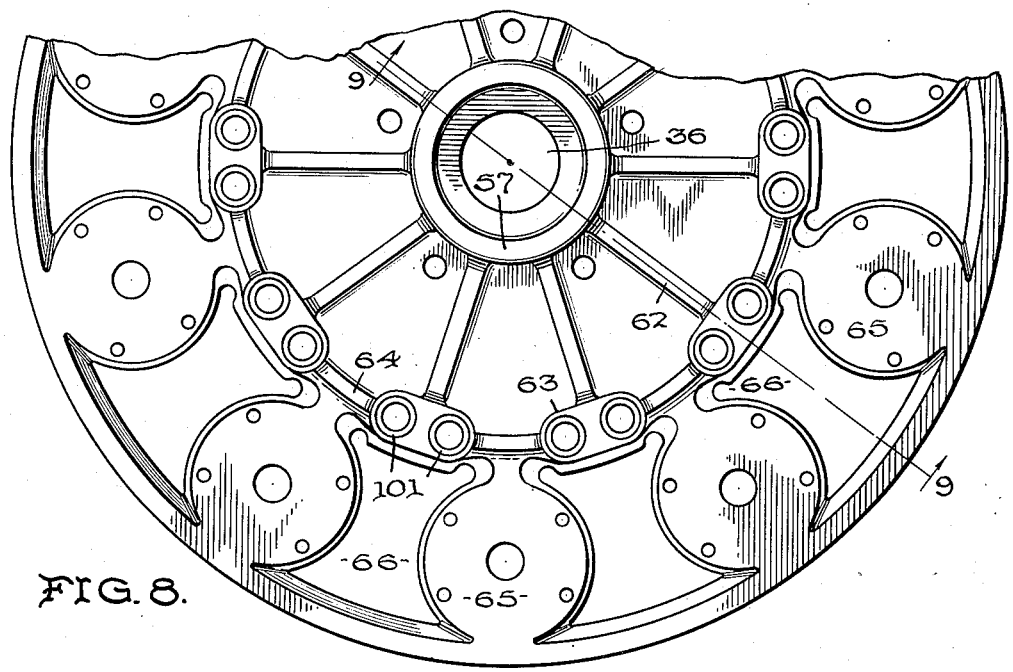
Figure 8 is a plan view of a fragmental portion of the ring member for supporting the lower dies.
Figure 9:
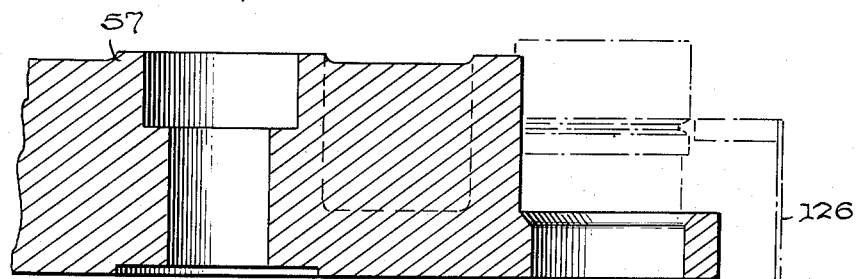
Figure 9 is a vertical sectional view showing a portion of the ring member with one of the dies in a closed position and a scraper finger for removing excess material from the die, the die and finger being shown in dotted line position.

The lower die supporting ring or base member 54 is of a foraminous or perforated construction embodying a plurality of spoke like members 62, Figure 8, radiating from the hub 57 and terminating in spaced guide members 63 that are joined together by webs 64. The outer edge portion of the base member 54 is formed to constitute supports or bases 65 for the lower mold or die members and these bases 65 are integrally formed with the webs 64 and with the outer rim or edge of the base member 54. Thus the outer portion of the base member 54 is provided with openings 66 between adjacent mold bases 65 as shown in Figure 8.

The mold bases 65 have mounted thereon, by suitable bolts 67, Figures 5 and 6, a lower or female die or mold member 68 which is formed with a tapered recess 69 of a configuration to produce an edible receptacle of a certain desired contour. The lower portion of the recess 69 terminates in a straight well portion 70 for the reception of a plunger 71 mounted upon a stem 72 that is slidably journaled in a bushing 73 supported in the base member 54. A coil spring 75 is disposed within the well 70 intermediate the base member 54 and the lower face of the plunger 71 for normally urging the plunger 71 to its projected position, as shown in Figure 5. A nut 76 is adjustably threaded upon the stem 72 to limit the outward movement of the plunger 71. As shown in Figures 5 and 6 the top edge portion of the lower die member 68 is formed with an annular recess into which is press fitted a ring 77 having a knife edge portion 78 that is adapted to cooperate with a complementary knife member on the upper mold to sever or trim the excess material from the receptacle formed from the baked sugar cakes and thus produce an edible receptacle having a smooth edge.

A top die or mold member is positioned to cooperate with the lower mold member for forming a receptacle and comprises a vertically extending post or bar 79 having an annular lip or flange 80 formed integrally therewith adjacent its top end portion. The bar 79 extends through an aperture provided in the end of an arm 81 and is secured to said arm by the flange 80 and a collar 82 that is threaded upon the bar 79 beneath the arm 81. Thus the flange 80 engages the top edge of the arm 81 while the collar 82 being threaded upon the bar 79 engages the bottom edge of the arm 81 and secures the bar 79 in the arm against any vertical movement. The lower end of the bar 79, Figure 6, is formed with a reduced portion 83 upon which is slidably mounted a disk member 84. The lower end of bar 79 is formed with a further reduced end portion 86 upon which is mounted a disk member 87. A plug or mold member 88, of a configuration complementary to the recess 69 of the lower mold, is mounted upon the reduced portion 86 of the bar 79 and is retained in engagement with the disk member 87 by a stud 89 that is threaded in the end of the bar 79. A coil spring 90 encircles the reduced portion 83 of the bar 79 to retain the disks 84 and 87 in spaced relation. A stud 91 extends through the disks 84 and 87 and is threaded at its lower end in the plug member 88 while nuts 92 are threaded upon the other end of said stud for varying the tension of the spring 90 and adjusting the spacing between the disks 84 and 87. The upper disk member 84 is provided with an annular recessed edge portion for the reception of an annular depending knife member 93 which is secured to the disk member 84 by screws 94. The knife member 93 projects below the bottom disk 87 and is adapted to cooperate with the knife edge 78 on the lower mold 68, upon the engagement of the top and bottom molds, to sever or trim the baked sugar cakes and thus produce a receptacle having a smooth even edge. The stud 91 and nuts 92 provide means for adjusting the knife member 93 with respect to the plug 88 and consequently for varying the engagement between the knife members 78 and 93.

Figure 1:
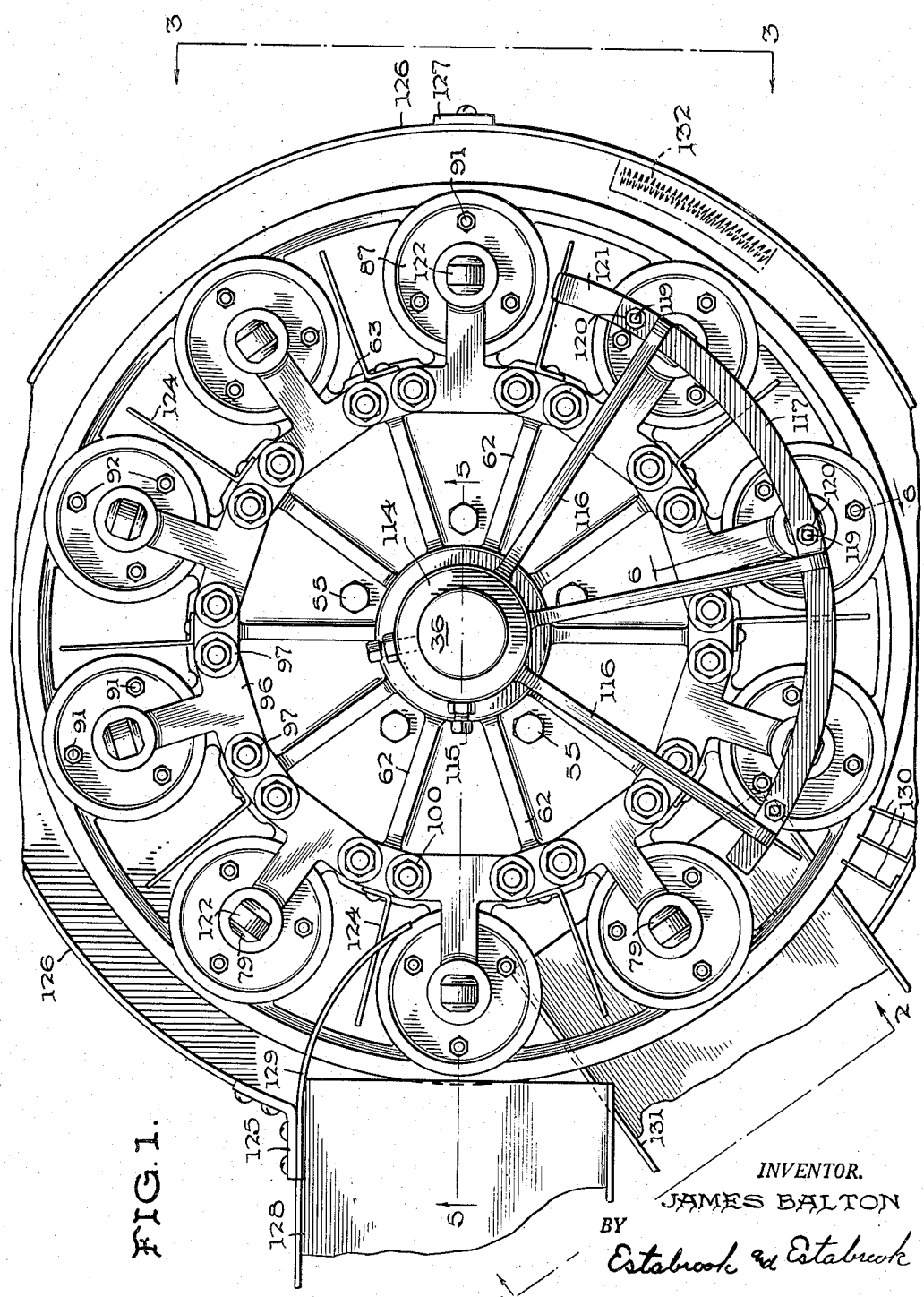
Figure 1 is a top plan view of an edible receptacle forming apparatus embodying the present invention.

The upper die supporting or carrying arm 81 is provided at its inner end with a transversely extending rib 96 that terminates in spaced bosses 97, Figures 1 and 6. The bosses 97 are adapted to receive the reduced end portions 98 of die lifting or actuating rods 99 and suitable washers and nuts 100 are mounted on the upper ends of said rods 99 for securing them in the bosses 97. The upper die actuating rods 99 extend downwardly through spaced apertures provided in the guide members 63 of the lower die supporting ring member 54, Figures 5 and 8. The lower ends of the rods 99 project through spaced apertures provided in the guide member 49, Figure 5, with suitable bearing rings 101 and 102 being provided in said guide members 63 and 49, respectively, for said rods. Thus as ring gear 33 and plate 34 are rotated about post 36 by gear 29 the sleeves 42 and 48 are rotated which in turn rotate guide member 49 and the lower die supporting ring member 54 so that the upper and lower coacting die or mold members of each set of dies or molds are rotated as a unit about the central supporting post 36. Furthermore, each of the several upper die members are carried by a pair of rods 99, Figure 3.

Figure 3:
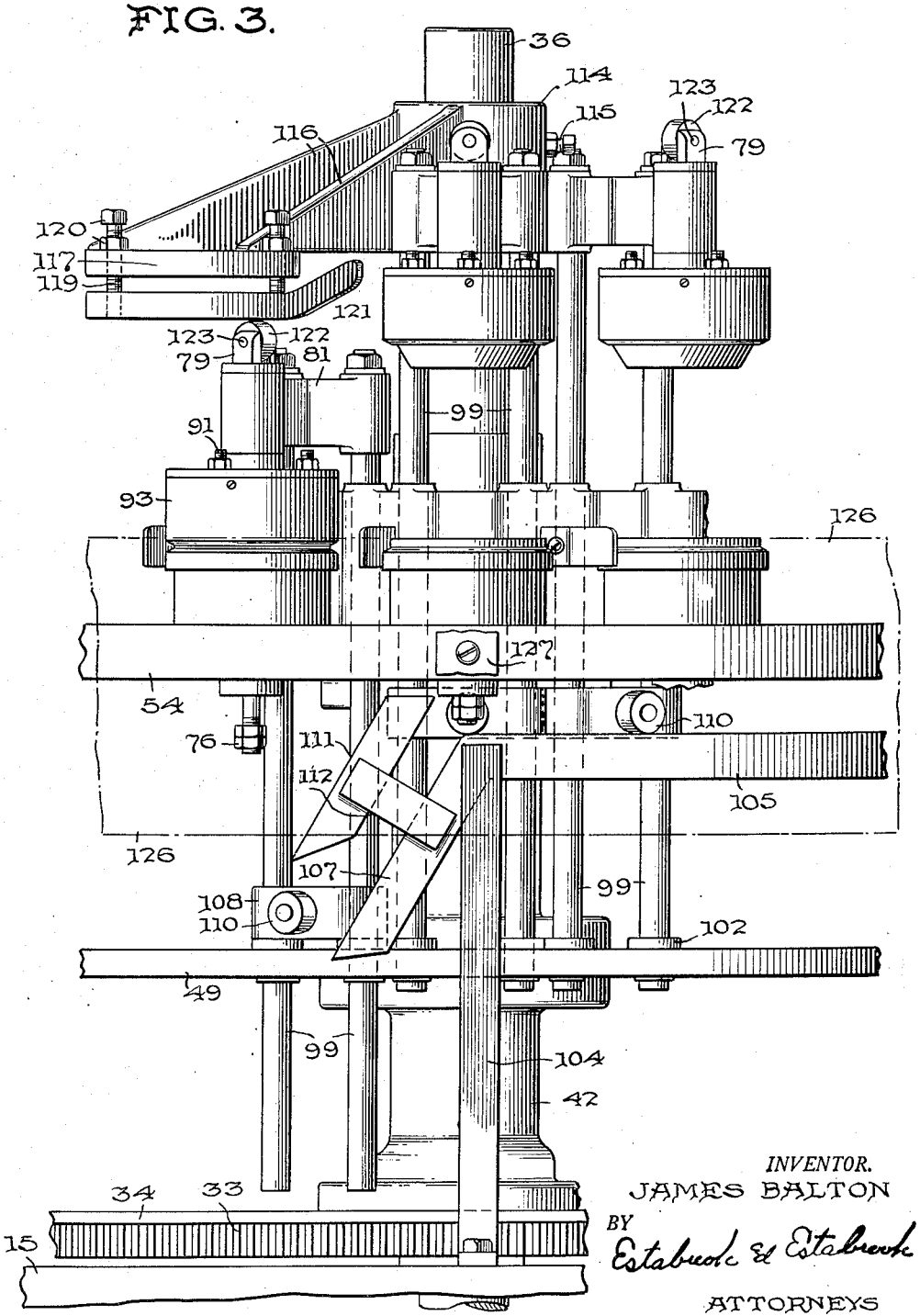
Figure 3 is a side elevational view of another portion of the present apparatus, the view being taken on a plane indicated by the lines 3—3 of Figures 1 and 4.

As shown in Figures 2 and 3 the base member 15 has secured thereto, by suitable bolts, a plurality of vertically extending circumferentially spaced support members 104 which have a cam track 105 secured to their free upper ends. The cam track 105 which may be secured to the supports 104 in any suitable manner, such as welding, is of an arcuate configuration and extends a distance of approximately two-thirds of the way around the base member 15, Figure 4. The cam track 105 terminates in a pair of inclined portions, the inclined portion 106, Figure 2, being designated the elevating or raising portion and the inclined portion 107, Figure 3, being designated the descending or lowering portion.

The lower end portions of each pair of upper die actuating rods 99 are joined together by a yoke 108, Figures 2, 3 and 7. The yoke 108 which is secured to the rods 99 by pins 109, Figure 5, carries a roller 110, Figures 2 and 3, which rides over the cam track 105 upon the rotation of the sleeves 42 and 48. Thus upon the rotation of the sleeves 42 and 48 and guide plate 49 each roller 110 moves up the inclined or elevating portion 106 of the cam track 105 and consequently raises its respective upper die or mold member. As the roller reaches the cam track 105 it commences to travel over same, upon the continued rotation of the sleeves 42 and 48 and guide member 49, so that during the period of travel of the roller 110 on the cam track 105 the upper and lower die or mold members are separated whereby the baked sugar cakes may be placed upon the lower die members. The path of movement of the roller 110 upon the cam track 105 is in a clockwise direction when viewing Figure 4. When the roller 110 reaches the downwardly inclined or lowering portion 107 of the cam track 105 the upper die or mold member is moved into engagement with the bottom mold due to the weight of the upper die member and also to the inclination of the cam track 107. The portion 107 of the cam track is provided with a guard 111, Figure 3, that is secured to the cam track 107 in spaced relation by a bracket 112. The upper end of the guard 111 projects above the cam track 105, Figure 3, and acts as a stop for the roller 110 thereby insuring that the roller will follow the portion 107 of the cam track and thus move the upper die member into engagement with the lower die to form a receptacle.

The weight of the upper mold or die member is supported or carried by the lower die or mold member 68 so that upon the engagement of the lower die by the upper die the baked sugar cake will be molded or pressed into the desired shape and configuration as determined by the configuration of the recess 69 of the lower die and the plug member 88 of the upper die. The two mold or die members are in engagement during the interval that the roller 110 travels from approximately the point A to the point B, Figure 4. At the point designated A in Figure 4 the roller 110 is just leaving the portion 107 of the cam track, see Figure 3, and the two molds are in engagement with one another, while at approximately the point B in Figure 4 the roller 110 engages the inclined portion 106 of the cam track, see Figure 2, and the two molds separate as the top or upper mold is elevated by the roller 110 and rods 99 and arm 81.

The upper end portion of the supporting post or column 36 has a collar 114, Figures 2 and 3, secured thereon by set screws 115. The collar 114 is formed with a plurality of radially extending arms 116 which have their outer ends connected, as by welding or any other suitable means, to an arcuate shaped rail 117, Figures 1 and 3. A cam track or rail 118 of an arcuate configuration complementary to the rail 117 is dependently supported from said rail 117 by bolts 119 which are adjustably mounted in the rail 117 by nuts 120. The forward or entrant end of the cam track 118 is formed with an inclined or upwardly projecting portion 121 that acts as a guide member for directing cam rollers into engagement with the cam track 118. The collar 114 is adjustably mounted on the post 36 by the set screws 115 so that the cam track 118 is positioned to overlie the area designated A—B in Figure 4.

As shown in Figure 6, the upper end of the post 79, which supports and carries the upper die member, is bifurcated and has a roller 122 rotatably mounted therein on a pin 123 that projects through the upper end of the post 79. The roller 122 is so positioned within the bifurcated end of the post 79 as to have a portion thereof projecting above the top edge of said post and thus is adapted to engage the cam track 118 as the upper and lower die or mold members rotate about the post 36.

Figure 4:
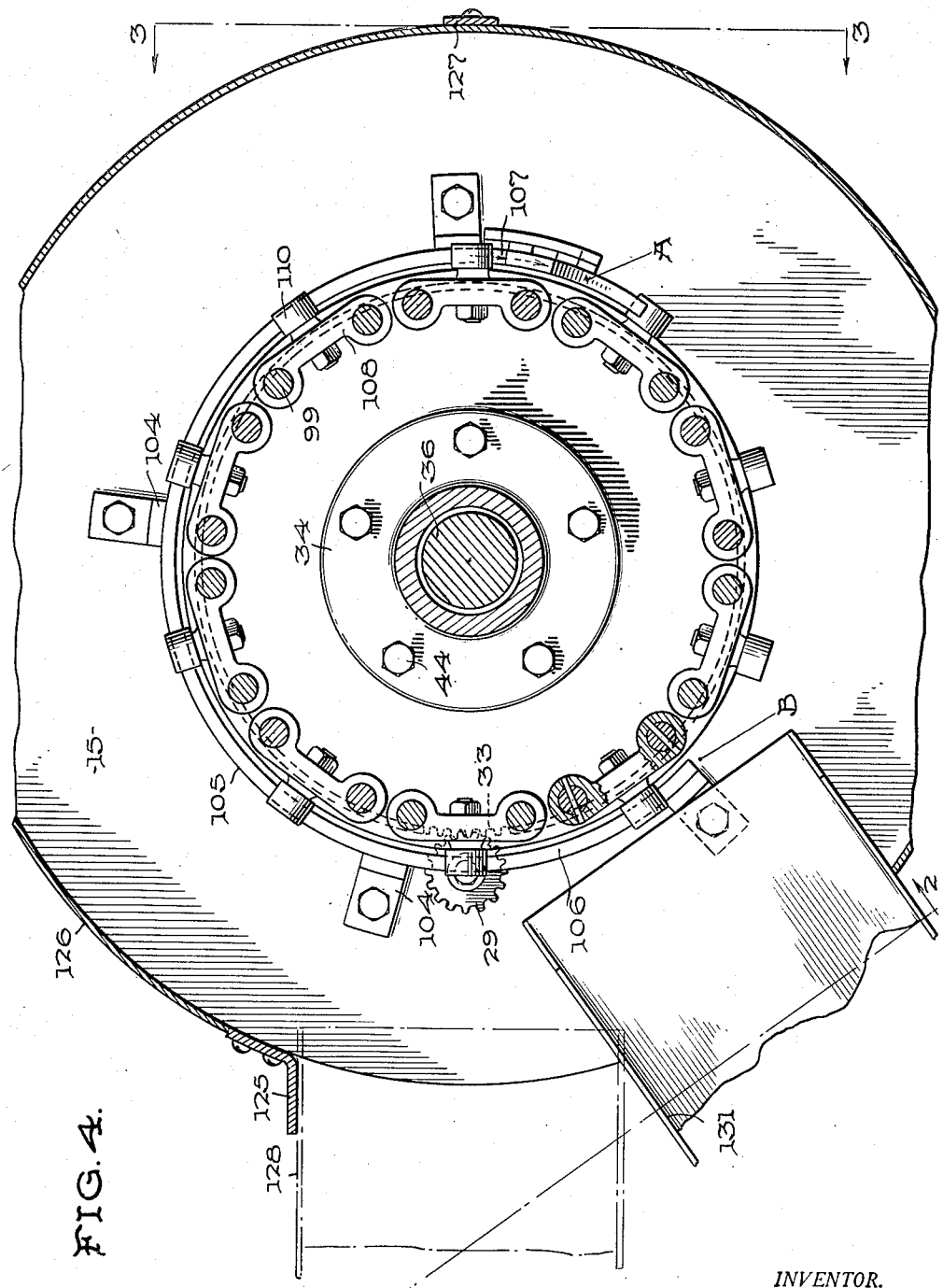
Figure 4 is a horizontal sectional view of the apparatus showing one of the cam tracks for actuating the upper die members, the section being taken on a plane indicated by the line 4—4 of Figure 2.

During the period of travel of the roller 110 over the cam track 105, Figure 4, the upper and lower die or mold members are maintained in spaced relation so that the baked sugar cakes may be placed on the lower mold member. As the roller 110 moves down the portion 107 of the cam track the upper die member is gradually lowered into engagement with the lower die member. Thus just as the roller 110 is ready to move off of the lower end of the portion 107 of the cam track, during the course of rotation of the apparatus, the upper and lower die members are in engagement and the initial forming or molding action is imparted to the sugar cake due to the weight of the upper die member. As the roller 110 leaves the portion 107 of the cam track and moves through the arcuate path from A to B of Figure 4 the roller 122 on the upper end of post 79 moves under the guide member 121 and into engagement with the cam track 118. The roller 122 is in engagement with the cam track 118 during the period that the roller 110 is moving from point A to point B, Figure 4, and during this period of rotation of the mold members about the post 36 the upper mold member is moved into complete and final engagement with the lower mold member for forming the sugar cake into a receptacle of the desired configuration. In addition to forming the sugar cake into a receptacle the engagement of the roller 122 with the cam track 118 also moves the knife member 93 of the upper mold into sliding engagement with the knife edge 78 of the lower mold for severing or trimming any and all excess material that might have been extruded from the two mold members and thus produce a receptacle having a smooth and even top edge.

As shown in Figure 1 a finger 124 is secured, in any suitable manner, to the outer face of the guide member 63, Figure 8, and arranged to project radially from said guide member and be disposed adjacent the lower mold member 68. The finger 124 is so positioned with respect to the top edge of the lower mold member 68 as to act as a stop or positioning member for the sugar cake. In other words the finger 124 and the outer face of the web 64, Figure 8, serve as positioning members for locating or placing the sugar cake in proper position on the lower mold.

The stationary base member 15 has affixed to its outer edge, by suitable screws, a vertically extending support 125, Figures 2 and 5, which has secured to its upper end a circular guard or shield 126, Figures 1 and 3 that extends approximately the entire distance around the lower die supporting ring member 54. Additional supports such as 127, Figure 1, may be secured at spaced intervals to the base 15 and shield 126 to retain said shield in proper position. The upper end portion of the support 125 has secured thereto a discharge chute 128, Figure 1, which has its upper end disposed in close proximity to the top edge of the lower mold member 68. There is also secured to the support 125, superjacent the chute 128, an arcuate shaped finger 129, Figure 1, which projects over and slightly above the top edge of the lower mold 68. Thus as the upper mold member is retracted or elevated, due to the engagement of the roller 110 with the inclined portion 106 of the cam track 105, the lower mold member 68, upon the continued rotation of the machine about the post 36, moves under the finger 129 so that the receptacle carried by the lower mold engages said finger and is directed into the discharge chute 128.

Figure 10:
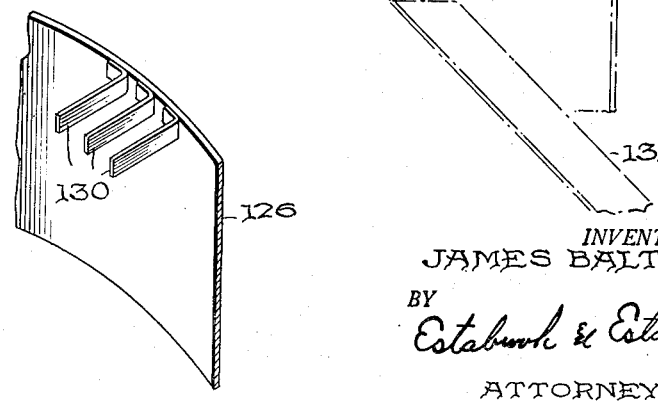
Figure 10 is a detail view showing the scraper fingers and guard for removing the excess material from the edges of the dies.

As shown in Figure 1, the free end of the shield 126, which is spaced from the discharge chute 128, is provided on its inner face with a plurality of resilient fingers 130, Figure 10, which are adapted to engage the surplus or waste portion of the sugar cake that has been severed by the knives 93 and 78 of the upper and lower mold members respectively. The surplus or waste material so removed by the fingers 130 from the mold members falls through the openings 66, Figure 8, formed in the foraminous lower mold supporting member 54 and into a trough 131, Figures 1 and 4, which is supported on the base member 15 by suitable brackets, not shown.

While the present invention has been described as comprising a single coacting mold structure embodying an upper and a lower mold member, it is to be understood that a plurality of top and bottom mold members are carried by the supporting ring member 54 as it rotates about the post 36. Thus, as is readily apparent from the drawings, the apparatus of the present invention is directed to a plurality of mold units wherein the coacting top and bottom mold members are continuously rotated about a central supporting post or column so that a continuous supply of receptacles may be formed by the present machine as the baked sugar cakes are placed upon the lower mold members when the molds are in their open position.

In the operation of the present machine the rotation of the drive shaft 19 causes the driven shaft 23 to be rotated through the gears 27 and 25 so that gear 29 mounted on drive shaft 23 will rotate the plate 34 through the ring gear 33. The rotation of plate 34 causes sleeves 42 and 48 to be rotated about the central supporting post 36, and said rotation of the sleeves 42 and 48 causes guide member 49 and the lower die supporting ring member 54 to also be rotated about post 36.

The lower die supporting ring member 54 and the guide member 49 carry the upper die lifting or actuating rods 99 so that upon the rotation of the guide member 49 and the supporting ring member 54 the die supporting rods 99 will also be rotated about the post 36, which rotative movement will cause the roller 110 to move over the cam track 105. As the roller 110 moves over the cam track 105 the upper die member is disposed in its elevated or raised position so that an attendant may then place upon the lower die member 68 the baked sugar cakes from which the receptacle is to be formed. As shown in Figure 1, the die members which have moved past the finger 129, in a clockwise direction, are in their open position so that the baked sugar cakes may be placed upon the lower die member and positioned thereon by means of the fingers 124 and the outer face of the web 64. Through the use of the fingers 124 in conjunction with the outer face of the web 64 the attendant is able to place the baked sugar cakes upon the lower die members with great rapidity so that the lower die members are capable of rotating about the post 36 at a constant speed as the fingers 124 and web 64 will insure the accurate positioning of the baked sugar cakes. As the roller 110 moves off of the cam track 105 and starts down the inclined portion 107 of the cam track the upper die member will be gradually lowered into engagement with the lower die member so that as the roller 110 moves away from the portion 107 of the cam track the upper die member will be in engagement with the lower die member and the plug or mold member 88 of the upper die member will be moved into the recess 69 of the lower die member thereby forcing the plunger 71 into the mold member 68 against the action of the spring 75. This movement of the upper die member into the lower die member causes the baked sugar cake to be molded or compressed into the form or configuration as defined by the recess 69 and plug 88. Any excess material from the baked sugar cake that may be protruding or extending from the die members will be severed through the action of the knife 93 moving into engagement with the knife 78 on the lower mold member. This movement of the knife member 93 into engagement with the knife member 78 is effected by roller 122 on the top of the upper die member moving into engagement with the cam track 118. The roller 122 approaches the cam track 118 and moves under the inclined or guiding portion 121 of the cam track at approximately the same time that the roller 110 leaves the inclined portion 107 of the cam track 105 and thus as the roller 110 moves through the arcuate path from the point A to the point B of Figure 4, the roller 122 is in engagement with the cam track 118. The cam track 118 is capable of being adjusted through the bolts 119 and nuts 120 so as to determine the amount of pressure that will be finally applied to the upper die member for finally compressing or molding the sugar cake into the desired confluration and also for determining the distance which the knife member 93 will travel with respect to the knife member 78. Furthermore, the movement or travel of the knife emmber 93 with respect to the knife member 78 may also be adjusted through the stud 91 and nuts 92 in the upper die member. The latter adjustment being compensated for by the coil spring 90 interposed between the disk members 84 and 87 of the upper die member.

As the roller 110 in its rotative path of movement engages the inclined portion 106 of the cam track 105 the roller 122 in its rotative path of travel is moving away from the discharge end of the cam track 118 so that as the roller 110 moves up the inclined portion 106 of the cam track the upper die member will be gradually raised or elevated. As the upper die member is being raised from the lower die member through the rods 99 and the roller 110 as it moves up the inclined portion 106 of the cam track, the spring 75 in the lower die member will force the plunger 71 outwardly of the recess 69 thereby raising the edible receptacle to the top edge portion of the lower die member 68. This movement of the plunger 71 is commensurate with the elevation of the upper die member, so, as the mold members continue their rotative path of movement, the upper die member will have been raised a sufficient distance to pass over the discharge finger 129 while the lower mold member will move under said finger 129. As the lower mold member moves under finger 129 the edible receptacle will be supported on the plunger 71, which is in its extended position, so that as the upper and lower die members continue in their path of movement the receptacle will be moved against the discharge finger 129 and directed onto the discharge chute 128.

As shown in Figure 1 the outer shield or guard member 126 has a plurality of inwardly projecting resilient scraper fingers 130 which engage the waste or surplus material of the sugar cake that is adhering to the mold members and through such engagement by the fingers 130 the waste material will be broken away from the mold members and directed through the openings 66 in the lower die supporting ring member 54 and into the trough 131.

Due to the ingredients contained in the baked sugar cakes it is imperative that the cakes be transferred from the cake or wafer molding machines to the lower molding members of the present apparatus with as great rapidity as possible so that the sugar cakes will be in a relatively soft and pliable condition during the molding or forming operation. The reason for this being that the sugar cakes tend to become crisp and brittle as they cool, and it has been found from experience that by retaining the sugar cakes in a warm and pliable condition they are more readily adapted to being formed into receptacles. Thus an electrical heating unit 132, Figure 1, of any suitable type, may be positioned on the inner face of the guard shield 126 so as to transmit heat to the upper and lower die members, which in their heated condition will tend to maintain the sugar cake in a somewhat pliable state and thereby overcome the tendency of the sugar cake to crack or break during the molding or forming operation.

I claim:

1. An edible receptacle forming apparatus having a rotatable supporting ring member, a die member mounted on said ring, a plurality of spaced guide members formed on said ring adjacent said die member, a rotatable guide plate disposed beneath said ring member, said guide members and guide plate having aligned apertures formed therein, a plurality of rods slidably mounted in the apertures formed in said guide members and guide plate, a second die member carried by said rods, a cam track disposed between said ring member and guide plate and means secured to said rods and engageable with said cam track for moving said second die member into and out of engagement with said first die member.

2. An edible receptacle forming apparatus having a rotatable supporting ring member, a die member mounted on said ring, a plurality of spaced guide members formed on said ring adjacent said die member, a rotatable guide plate disposed beneath said ring member, said guide members and guide plate having aligned apertures formed therein, a plurality of rods slidably mounted in the apertures formed in said guide members and guide plate, a second die member carried by said rods, a cam track disposed between said ring member and guide plate, a roller secured to said rods and engageable with said cam track for lowering and elevating said second die member into and out of engagement with the first die member.

3. An edible receptacle forming apparatus having a rotatable supporting ring member, a mold mounted on said ring member, a guide member formed on said ring member adjacent said mold, a guide plate disposed beneath said ring member and arranged to rotate in conjunction therewith, said guide member and guide plate having aligned apertures formed therein, a rod slidably mounted in the apertures formed in said guide member and guide plate, a second mold carried by said rod, a cam track having an inclined portion and a declining portion interposed between said ring member and guide plate, a roller secured to said rod and engageable with the inclined portion of said cam track for raising said second mold from said first mold and said roller upon the rotation of said ring member engaging the declining portion of said cam track for lowering said second mold into engagement with the first mentioned mold.

4. An edible receptacle forming apparatus having a rotatable supporting ring member, a mold mounted on said ring member, spaced guide members formed on said ring member adjacent said mold, a guide plate disposed beneath said ring member and arranged to rotate in conjunction therewith, said guide members and guide plate having aligned apertures formed therein, a plurality of rods slidably mounted in the apertures formed in said guide members and guide plate, a second mold carried by said rods, a cam track having an inclined portion and a declining portion interposed between said ring member and guide plate, a roller secured to said rods and engageable with the inclined portion of said cam track for raising said second mold from said first mold and said roller upon the rotation of said ring member engaging the declining portion of said cam track for lowering said second mold into engagement with the first mentioned mold, and a guard carried by the declining portion of said cam track for directing said roller onto said declining portion to insure the lowering of said second mentioned mold.

5. An edible receptacle forming apparatus having a base member with a vertically extending post secured thereto, a plate journaled on said post, driving means for rotating said plate, a sleeve on said post having its lower end secured to said plate, a guide plate having spaced openings secured to the upper end of said sleeve, a second sleeve on said post having its lower end secured to said guide plate, a foraminous ring member journaled on said post and secured to the upper end of said second sleeve, a plurality of molds for receiving pliable blanks of dough secured to said ring member in spaced relation, knife means provided on said molds, a pair of spaced guide members formed on said ring member adjacent each mold, said guide members having openings formed therein, rods slidably mounted in the openings in said guide members and having their lower ends extending through the openings provided in said guide plate, a mold secured to the upper end of each pair of rods in aligned relation with a mold on said ring member, a plurality of vertically extending supports secured to said base member in spaced relation, a cam track secured to said supports intermediate said ring member and guide plate, said cam track having a declining portion and an inclined portion, a yoke secured to each pair of rods adjacent their lower ends, a roller on each of said yokes, certain of said rollers engaging said inclined portion for raising certain of said second mentioned molds from the first mentioned molds and certain of said rollers engaging said cam track for retaining said raised molds in an elevated position and certain of said rollers engaging the declining portion of said cam track for lowering some of said second mentioned molds into engagement with the first mentioned molds upon the rotation of said plate, a collar secured to said post, a plurality of radial arms secured to said collar, a cam track supported on the free ends of said arms, a roller mounted on the upper end of each of the second mentioned molds, the rollers on said second mentioned molds engaging said second mentioned cam track upon the first mentioned rollers moving out of engagement with said declining portion for urging said second mentioned mold into said first mentioned mold, a discharge chute supported on said base member and projecting above said ring member, and a discharge finger positioned adjacent the upper end of said chute for engaging said edible receptacles formed from said blanks of dough and directing them into said chute subsequent to the separation of said molds.

6. An edible receptacle forming apparatus having a supporting member, a ring member having spaced apertured guide members rotatably mounted on said supporting member, a mold mounted on said ring member adjacent the guide members, an apertured guide plate rotatably mounted on said supporting member beneath said ring member, a plurality of rods slidably mounted in said guide members and guide plate, a mold carried by an end of said rods, a cam track having an inclined portion and a declining portion interposed between said ring member and guide plate, a roller secured to said rods adjacent their other end and engageable with the declining portion of said cam track upon the rotation of said ring member and guide plate to move said second mentioned mold into engagement with the first mentioned mold, a second cam track carried by said supporting member and positioned above said ring member, a roller mounted on said second mentioned mold and engageable with said second cam track subsequent to the engagement of the first mentioned roller with the declining portion of said first mentioned track for moving and retaining said second mentioned mold in engagement with the first mentioned mold, said first mentioned roller upon the continued rotation of said ring member engaging the inclined portion of said first mentioned cam track subsequent to the engagement of said second mentioned roller with the second mentioned cam track for elevating said second mentioned mold and means carried by the declining portion of said first mentioned cam track for directing the first mentioned roller onto said declining portion to insure the engagement of the second mentioned roller with the second mentioned cam track.

7. An edible receptacle forming apparatus having a supporting member, a ring member having spaced apertured guide members rotatably mounted on said supporting member, a mold mounted on said ring member adjacent the apertured guide members for receiving a pliable blank of dough, knife means secured to said mold, an apertured guide plate rotatably mounted on said supporting member beneath said ring member, a plurality of rods slidably mounted in the apertures in said guide members and guide plate, a mold carried by an end of said rods, knife means secured to said mold, a cam track having an inclined portion and a declining portion interposed between said ring member and guide plate, a roller secured to said rods adjacent their other end and engageable with the declining portion of said cam track upon the rotation of said ring member and guide plate to move said second mentioned mold into engagement with the first mentioned mold to form a receptacle from said blank of dough, a second cam track carried by said supporting member and positioned above said ring member, a roller mounted on said second mentioned mold and engageable with said second cam track subsequent to the engagement of the first mentioned roller with the declining portion of said first mentioned track for moving the knife means on said molds into engagement with one another for trimming excess material from the edge of the receptacle formed by said molds.

8. An edible receptacle forming apparatus having a base member with a vertically extending support secured thereto, a ring member rotatably mounted on said supporting member and formed with spaced apertured guide members, a mold mounted on said ring member adjacent the guide members, an apertured guide plate rotatably mounted on said supporting member beneath said ring member, a plurality of rods slidably mounted in said apertured guide members and guide plate, a mold carried by an end of said rods, a cam track carried by said base and interposed between said ring member and guide plate, said cam track having an inclined portion and a declining portion, a roller secured to the other end of said rods and engageable with the declining portion of said cam track upon the rotation of said ring member and guide plate to move said second mentioned mold into engagement with the first mentioned mold, a second cam track carried by said supporting member and positioned above said ring member, a roller on said second mentioned mold engageable with said second cam track subsequent to the engagement of the first mentioned roller with the declining portion of said first mentioned track for moving said second mentioned mold into engagement with the first mentioned mold, a discharge chute carried by said base member and positioned beneath said ring member, scraper means carried by said base member and positioned to engage the mold mounted on said ring member during a period of the rotative movement of said ring member for removing excess material from said mold member and directing same into said chute.

9. An edible receptacle forming apparatus having a base member, a ring member supported on said base member for rotative movement with respect thereto, said ring member having spaced apertured guide members formed thereon, a mold mounted on said ring member adjacent the apertured guide members for receiving a pliable blank of dough, knife means secured to said mold, an apertured guide plate supported on said base member for rotative movement with respect thereto, said guide plate being positioned intermediate said base member and ring member, a plurality of rods slidably mounted in the apertures in said guide members and guide plate, a mold carried by an end of said rods, knife means secured to said mold, a cam track having an inclined portion and a declining portion interposed between said ring member and guide plate, a roller secured to said rods adjacent their other end and engageable with the declining portion of said cam track upon the rotation of said ring member and guide plate to move said second mentioned mold into engagement with the first mentioned mold to form a receptacle from said blank of dough, a second cam track carried by said base member and positioned above said ring member, a roller mounted on said second mentioned mold and engageable with said second cam track for moving the knife means on said molds into engagement with one another to trim excess material from the edge of the receptacle formed by said molds, a discharge chute carried by said base member and projecting above said ring member, a discharge finger carried by said base member and positioned adjacent the upper end of said chute for engaging the receptacles on said ring member and directing them into said chute.

10. An edible receptacle forming apparatus having a base member, a ring member supported on said base member for rotative movement with respect thereto, said ring member having spaced apertured guide members formed thereon, a mold mounted on said ring member adjacent the apertured guide members for receiving a pliable blank of dough, knife means secured to said mold, an apertured guide plate supported on said base member for rotative movement with respect thereto, said guide plate being positioned intermediate said base member and ring member, a plurality of rods slidably mounted in the apertures in said guide members and guide plate, a mold carried by an end of said rods, knife means secured to said mold, a cam track having an inclined portion and a declining portion interposed between said ring member and guide plate, a roller secured to said rods adjacent their other end and engageable with the declining portion of said cam track upon the rotation of said ring member and guide plate to move said second mentioned mold into engagement with the first mentioned mold to form a receptacle from said blank of dough, a second cam track carried by said base member and positioned above said ring member, a roller mounted on said second mentioned mold and engageable with said second cam track for moving the knife means on said molds into engagement with one another to trim excess material from the edge of the receptacle formed by said molds, a discharge chute carried by said base member and positioned beneath said ring member, a circular shield carried by said base member and positioned about said ring member, scraper means carried by said shield for removing the excess material trimmed from the edge of the receptacle by said knives and directing said excess material into said chute.

11. An edible receptacle forming apparatus having a base member, a ring member supported on said base member for rotative movement with respect thereto, said ring member having spaced apertured guide members formed thereon, a mold mounted on said ring member adjacent the apertured guide members for receiving a pliable blank of dough, knife means secured to said mold, an apertured guide plate supported on said base member for rotative movement with respect thereto, said guide plate being positioned intermediate said base member and ring member, a plurality of rods slidably mounted in the apertures in said guide members and guide plate, a mold carried by an end of said rods, knife means secured to said mold, an arcuate shaped cam track carried by said base and interposed between said ring member and guide plate, said cam track having its ends disposed in spaced relation with one another and defining an inclined portion and a declining portion, a roller secured to said rods adjacent their other end and engageable with the declining portion of said cam track upon the rotation of said ring member and guide plate to move said second mentioned mold into engagement with the first mentioned mold to form a receptacle from said blank of dough, a second cam track carried by said base member and positioned above said ring member and arranged to overlie the space between the ends of the first mentioned cam track, a roller mounted on said second mentioned mold and engageable with said second mentioned cam track while the first mentioned roller is moving from the declining to the inclined portion of the first mentioned cam track for moving the knife means on said molds into engagement with one another to trim excess material from the edge of the receptacle formed by said molds.

12. A pastry molding apparatus having a rotatable ring member with a mold mounted thereon for receiving a pliable blank of dough, said mold being formed with a recess tapering from the top edge towards the bottom thereof, a spring actuated plunger disposed in said recess, knife means positioned around the top edge of said mold, a second mold engageable with said first mold, said second mentioned mold including a bar having a plug secured to an end thereof and being of a configuration complementary to said recess, a pair of disks mounted on said bar in spaced relation, spring means interposed between said disks, knife means carried by one of said disks, means extending through said disks and engaging said plug for adjusting said knife means with respect to said plug, and means for moving said second mentioned mold into engagement with said first mentioned mold for urging said plug into said recess and forcing said plunger into said recess contemporaneous with the knife means on the respective molds coacting with one another to trim the excess dough material from the receptacle formed by said plug and recess.

JAMES BALTON.

References Cited in the file of this patent
UNITED STATES PATENTS

| Number | Name | Date |
|---|---|---|
| 817,488 | Hutchison | Apr. 10, 1906 |
| 901,937 | Scott | Oct. 20, 1908 |
| 903,584 | Kohler | Nov. 10, 1908 |
| 2,123,230 | Clark et al. | July 12, 1938 |
| 2,280,324 | Tracy | Apr. 21, 1942 |